United States Patent
Liu et al.

(10) Patent No.: US 7,936,756 B2
(45) Date of Patent: May 3, 2011

(54) ROUTING SYSTEM, CONTROL ELEMENT, ROUTING METHOD AND FORMING METHOD FOR EXCHANGING TABLE AND FORWARDING TABLE

(75) Inventors: Pin-Chuan Liu, Hsinchu (TW); Meng-Hsiang Yang, Taichung County (TW); Po-Chun Kang, Chiayi County (TW)

(73) Assignee: Industrial Technology Research Institute, Hsinchu (TW)

(*) Notice: Subject to any disclaimer, the term of this patent is extended or adjusted under 35 U.S.C. 154(b) by 389 days.

(21) Appl. No.: 12/035,476

(22) Filed: Feb. 22, 2008

(65) Prior Publication Data
US 2009/0135823 A1 May 28, 2009

(30) Foreign Application Priority Data
Nov. 26, 2007 (TW) ................................ 96144853 A (51) Int. Cl.
*H04L 12/28* (2006.01)
*H04L 12/56* (2006.01)
(52) U.S. Cl. ........................................ 370/392; 370/401
(58) Field of Classification Search .................... None
See application file for complete search history.

(56) References Cited

U.S. PATENT DOCUMENTS

| 7,126,944 | B2 | 10/2006 | Rangarajan et al. |
| 7,480,304 | B2* | 1/2009 | Yeh et al. ........................ 370/398 |
| 7,646,759 | B2* | 1/2010 | Hegde et al. .................... 370/351 |
| 2003/0185226 | A1* | 10/2003 | Tang et al. ...................... 370/428 |
| 2004/0165601 | A1* | 8/2004 | Liu et al. ......................... 370/401 |
| 2008/0016243 | A1* | 1/2008 | Basso et al. ..................... 709/238 |

\* cited by examiner

*Primary Examiner* — Chirag G Shah
*Assistant Examiner* — Minh-Trang Nguyen
(74) *Attorney, Agent, or Firm* — Thomas|Kayden (57) ABSTRACT

In a routing method, a control element firstly forms a forwarding table and an exchanging table according to a routing table. Next, a first forwarding element receives a packet, and then obtains a label from the forwarding table according to a destination address of the packet, and determines to output the packet from the first forwarding element or a second forwarding element according to the label. If the packet is to be outputted from the first forwarding element, it is directly outputted to the destination address of the packet; otherwise the second forwarding element receives the packet and the label. Next, the second forwarding element obtains a next forwarding path from the exchanging table according to the label to forward the packet. The control element and the first and second forwarding elements constitute a routing system.

29 Claims, 8 Drawing Sheets

FIG. 1

| Element symbol | Connection port symbol | Outward or inward |
|---|---|---|
| Second forwarding element | 1 | Outward |
| Second forwarding element | 4 | Inward |
| First forwarding element | 2 | Outward |
| First forwarding element | 3 | Outward |
| First forwarding element | 5 | Inward |

FIG. 2

| | Routing subnet field (51) | Routing interface field (52) | Routing gateway field (53) |
|---|---|---|---|
| 50(1) | a | 1 | * |
| 50(2) | b | 2 | * |
| 50(3) | c | 3 | * |
| 50(4) | d | 2 | A |
| 50(5) | e | 2 | A |
| 50(6) | f | 2 | A |
| 50(7) | g | 2 | A |

FIG. 3

| | Subnet field (61) | Interface field (63) | Gateway field (64) | Label field (62) |
|---|---|---|---|---|
| 60(1) | a | 5 | 4 | 1 |
| 60(2) | b | 2 | * | 0 |
| 60(3) | c | 3 | * | 0 |
| 60(4) | d | 2 | A | 0 |
| 60(5) | e | 2 | A | 0 |
| 60(6) | f | 2 | A | 0 |
| 60(7) | g | 2 | A | 0 |

| | Subnet field | Interface field | Gateway field | Label field |
|---|---|---|---|---|
| 70(1) | a | 1 | * | 0 |
| 70(2) | b | 4 | 5 | 1 |
| 70(3) | c | 4 | 5 | 3 |
| 70(4) | d | 4 | 5 | 2 |
| 70(5) | e | 4 | 5 | 2 |
| 70(6) | f | 4 | 5 | 2 |
| 70(7) | g | 4 | 5 | 2 |

71 — Subnet field; 73 — Interface field; 74 — Gateway field; 72 — Label field

| | Label field | Interface field | Gateway field |
|---|---|---|---|
| 80(1) | 1 | 2 | * |
| 80(2) | 2 | 2 | A |
| 80(3) | 3 | 3 | * |

81 — Label field; 82 — Interface field; 83 — Gateway field

| | Label field | Interface field | Gateway field |
|---|---|---|---|
| 90(1) | 1 | 1 | * |

91 — Label field; 92 — Interface field; 93 — Gateway field

ROUTING SYSTEM, CONTROL ELEMENT, ROUTING METHOD AND FORMING METHOD FOR EXCHANGING TABLE AND FORWARDING TABLE

This application claims the benefit of Taiwan application Serial No. 96144853, filed Nov. 26, 2007, the subject matter of which is incorporated herein by reference.

BACKGROUND OF THE INVENTION

1. Field of the Invention

The invention relates in general to an allocation method of a routing table, and more particularly to an allocation method of a routing table by label mapping.

2. Description of the Related Art

Because the demand on the network is greatly increased, many researches have been made to increase the flexibility and the stability of a network apparatus so that the architecture for physically separating control elements from forwarding elements is formed. In order to increase the flexibility of extending the apparatus under this architecture, the control element can manage many separate forwarding elements. In the present routing system having many forwarding elements, one routing search has to be made when a packet passes through each of the forwarding elements so that a next forwarding path of the packet can be obtained. However, the routing search wastes a lot of time in the network apparatus so that the efficiency of routing the packet in the routing system is decreased.

SUMMARY OF THE INVENTION

The invention is directed to a routing system, a control element, a routing method and a forming method for an exchanging table and a forwarding table. A label is obtained from the forwarding table of a first forwarding element according to a destination address of a packet, and it is detected whether to directly output the packet from the first forwarding element to the destination address or from a second forwarding element according to the label. The second forwarding element receives the packet and the label, and then obtains a next forwarding path from the exchanging table according to the label to forward the packet.

According to a first aspect of the present invention, a routing system including a control element, a first forwarding element and a second forwarding element is provided. The control element forms a forwarding table and an exchanging table according to a routing table. The first forwarding element receives a packet, obtains a corresponding label from the forwarding table according to a destination address of the packet, and determines whether to output the packet directly from the first forwarding element to the destination address of the packet according to the label. The second forwarding element receives the packet and the label outputted from the first forwarding element and obtains a next forwarding path from the exchanging table according to the label to forward the packet if the packet is to be outputted from the second forwarding element.

According to a second aspect of the present invention, a control element applied to a routing system is provided. The control element includes a forwarding table forming unit and an exchanging table forming unit. The forwarding table forming unit forms a forwarding table of a first forwarding element according to a routing table. The first forwarding element receives a packet and obtains a corresponding label from the forwarding table according to a destination address of the packet. The exchanging table forming unit forms an exchanging table of a second forwarding element according to the routing table. The second forwarding element receives the packet and the label outputted from the first forwarding element, and obtains a next forwarding path from the exchanging table according to the label to forward the packet.

According to a third aspect of the present invention, a routing method is provided. First, a control element forms a forwarding table and an exchanging table according to a routing table. Next, a first forwarding element receives a packet. Then, the first forwarding element obtains a corresponding label from the forwarding table according to a destination address of the packet, and determines whether to output the packet from the first forwarding element or a second forwarding element according to the label. The packet is outputted to the destination address of the packet directly if the packet is to be outputted from the first forwarding element. If the packet is to be outputted from the second forwarding element, the second forwarding element receives the packet and the label. Next, the second forwarding element obtains a next forwarding path from the exchanging table according to the label to forward the packet. The control element, the first forwarding element and the second forwarding element constitute a routing system.

According to a fourth aspect of the present invention, a forming method for an exchanging table and a forwarding table of a control element is provided. The control element forms the forwarding table and the exchanging table according to a routing table. The routing table has a plurality of pieces of routing data. Each of the pieces of routing data has a routing interface field and a routing gateway field. The exchanging table has a plurality of pieces of exchanging data, and the forwarding table has a plurality of pieces of forwarding data. The forming method includes the following steps. First, each of the pieces of exchanging data is formed according to whether a connection port recorded in the routing interface field of each of the pieces of routing data pertains to a second forwarding element. Next, each of the pieces of forwarding data is formed according to whether the connection port recorded in the routing interface field of each of the pieces of routing data pertains to a first forwarding element. The control element, the first forwarding element and the second forwarding element constitute a routing system. The first forwarding element receives a packet, obtains a corresponding label from the forwarding table according to a destination address of the packet, and determines whether the packet is to be directly outputted to the destination address of the packet from the first forwarding element according to the label. The second forwarding element receives the packet and the label outputted from the first forwarding element and obtains a next forwarding path from the exchanging table according to the label to forward the packet if the packet is to be outputted from the second forwarding element.

Additional features and advantages of the invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodi-

DETAILED DESCRIPTION OF THE INVENTION

The routing system, the control element, the routing method and the forming method for the exchanging table and the forwarding table according to the invention are applied to a routing system in which the control element is physically separated from many forwarding elements. For the sake of clear illustration, two forwarding elements are provided in this embodiment without any limitative purpose. That is, the routing system, the control element, the routing method and the forming method for the exchanging table and the forwarding table according to the invention may be actually applied to a routing system having three or more than three forwarding elements.

Figure 1:
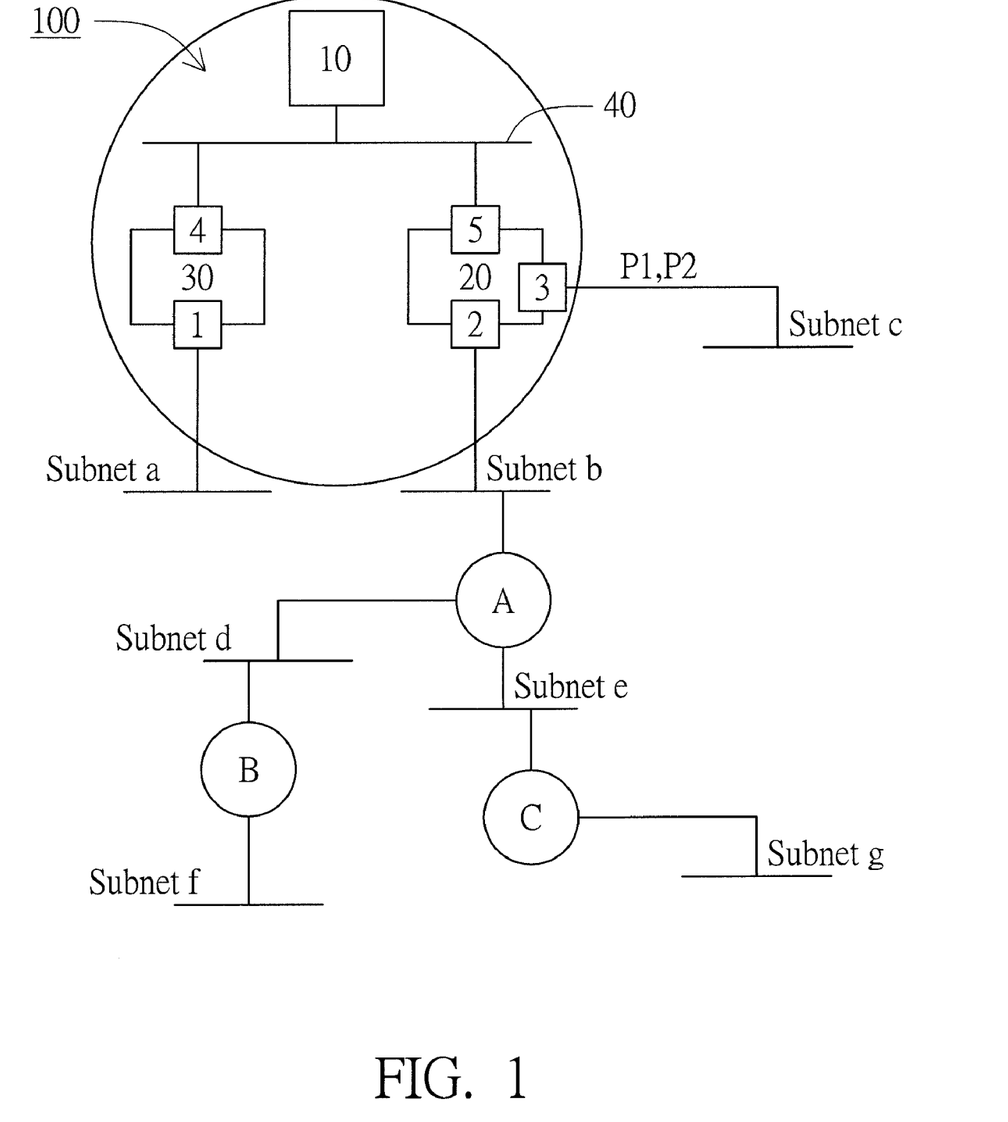
FIG. 1 is a schematic illustration showing network topology with a routing system according to a preferred embodiment of the invention.

FIG. 1 is a schematic illustration showing network topology with a routing system 100 according to a preferred embodiment of the invention. Referring to FIG. 1, the routing system 100 connected to an external network includes a control element 10, a first forwarding element 20 and a second forwarding element 30. The control element 10 is connected to the first forwarding element 20 and the second forwarding element 30 through an internal network 40, such as a TCP/IP network. In this embodiment, the first forwarding element 20 has connection ports 2, 3 and 5. The second forwarding element 30 has connection ports 1 and 4. The first forwarding element 20 provides the connection port 5 to be connected to the control element 10, and the second forwarding element 30 provides the connection port 4 to be connected to the control element 10.

The external network connected to the routing system 100 includes subnets a, b, c, d, e, f and g. The routing system 100 is connected to a routing apparatus A through the subnet b. The routing apparatus A is connected to a routing apparatus B through the subnet d, and the other end of the routing apparatus B is connected to the subnet f. The routing apparatus A is connected to a routing apparatus C through the subnet e, and the other end of the routing apparatus C is connected to the subnet g. The first forwarding element 20 provides the connection port 2 to be connected to the subnet b, and provides the connection port 3 to be connected to the subnet c. The second forwarding element 30 provides the connection port 1 to be connected to the subnet a.

Figure 3:
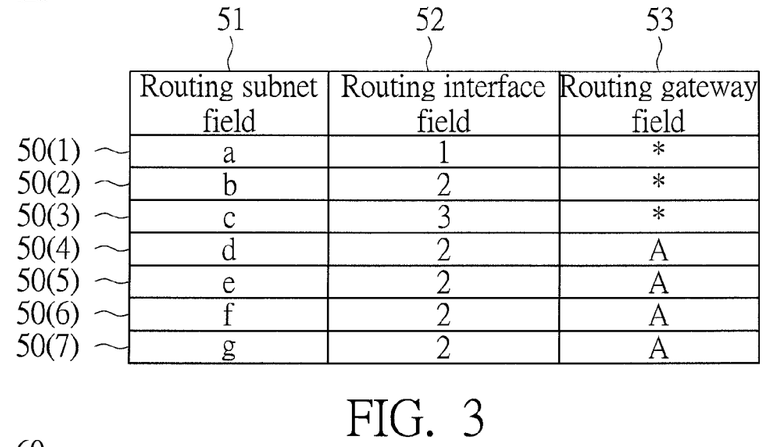
FIG. 3 shows a routing table obtained according to the routing system of FIG. 1.

The control element 10 forms a forwarding table and an exchanging table of each forwarding element according to a routing table 50 (depicted in FIG. 3). In this embodiment, the control element 10 forms a forwarding table 60 (depicted in FIG. 4A) of the first forwarding element 20, a forwarding table 70 (depicted in FIG. 4B) of the second forwarding element 30, an exchanging table 80 (depicted in FIG. 5A) of the first forwarding element 20 and an exchanging table 90 (depicted in FIG. 5B) of the second forwarding element 30.

As shown in FIG. 1 of the illustrated example herein, the first forwarding element 20 receives a packet P1 from the external network through the connection port 3, and a destination address of the packet P1 is connected to the connection port 1 of the second forwarding element 30. The first forwarding element 20 obtains a label L1 (not shown) corresponding to the destination address of the packet P1 from the forwarding table 60 (depicted in FIG. 4A). The first forwarding element 20 forwards the packet P1 and the label L1 to the second forwarding element 30 through the connection port 5 according to the label L1. The second forwarding element 30 receives the packet P1 and the label L1 from the internal network 40 through the connection port 4, and then obtains a next forwarding path from the exchanging table 90 (depicted in FIG. 5B) according to the label L1, and forwards the packet P1 by the obtained next forwarding path.

Figure 4A:
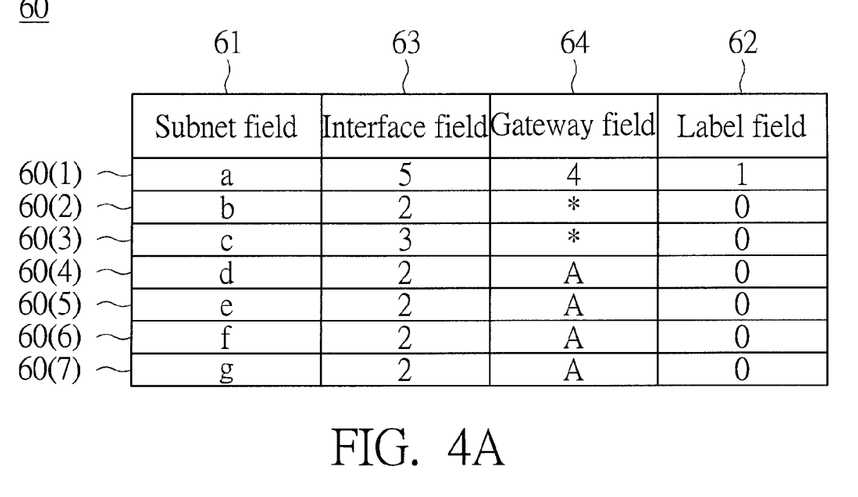
FIG. 4A shows a forwarding table of the first forwarding element of FIG. 1.
Figure 5A:
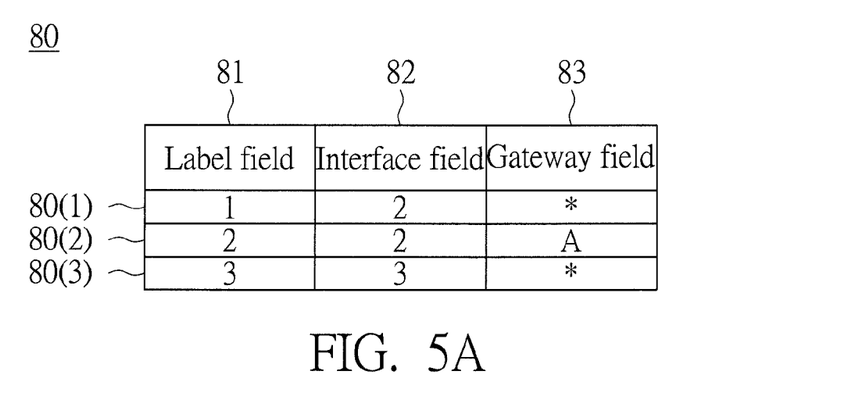
FIG. 5A shows an exchanging table of the first forwarding element of FIG. 1.
Figure 5B:
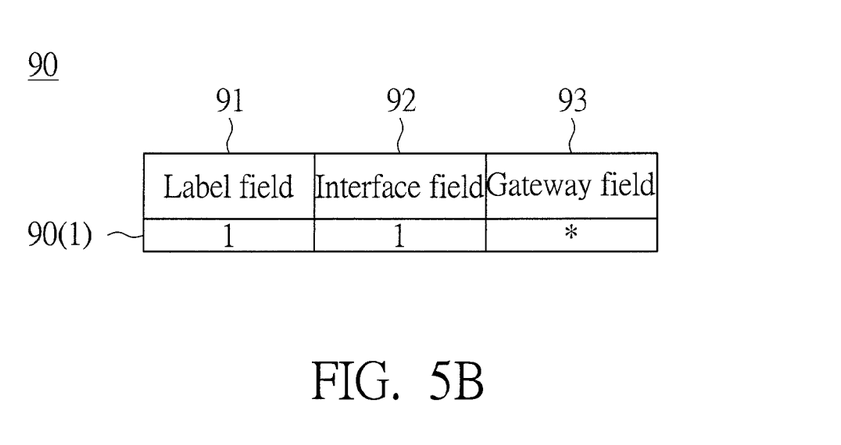
FIG. 5B shows an exchanging table of the second forwarding element of FIG. 1.

Consequently, the forwarding table 60 and the destination address of the packet P1 are searched when the packet P1 is forwarded via the first forwarding element 20. After receiving the packet P1 and the label L1, the second forwarding element 30 only has to obtain a corresponding next forwarding path from the exchanging table 90 directly according to the label L1. The label L1 serves as a label mapping index in the information of the next forwarding path obtained from the exchanging table 90. That is, if the label L1 is "x", the next forwarding path corresponding to the label L1 is preferably stored in the $x^{th}$ exchanging data in the exchanging table 90. Consequently, the second forwarding element 30 can acquire the information directly from the corresponding field according to the label L1 after receiving the label L1 and the packet P1. Thus, the searching time can be greatly shortened and the routing efficiency can be thus enhanced.

In addition, illustrations will be made according to the example, in which the first forwarding element 20 receives a packet P2 from the external network via the connection port 3, and the destination address of the packet P2 is connected to the connection port 2 of the first forwarding element 20. When the first forwarding element 20 receives the packet P2 from the external network via the connection port 3, the first forwarding element 20 obtains a label L2 corresponding to the destination address of the packet P2 from the forwarding table 60. The first forwarding element 20 forwards the packet P2 from the connection port 2 corresponding to the label L2 to the external network directly according to the label L2.

After receiving the packet from the external network, the first forwarding element 20 obtains the label from the forwarding table 60 according to the destination address of the packet, and determines whether the packet is to be directly outputted from the first forwarding element 20 to the destination address of the packet according to the label. If the packet is to be outputted from the second forwarding element 30, the second forwarding element 30 receives the packet and the label, and obtains a next forwarding path from the exchanging table 90 according to the label, wherein the packet is forwarded by the next forwarding path. In this embodiment, the method of determining whether the packet is to be outputted from the first forwarding element 20 or the second forwarding element 30 is to judge whether the label is a specific value. When the label is not the specific value, the first forwarding element 20 outputs the packet and the label to the second forwarding element 30. When the label is the specific value, the first forwarding element 20 directly outputs the packet to the external network according to other field information of the forwarding table 60.

Figure 2:
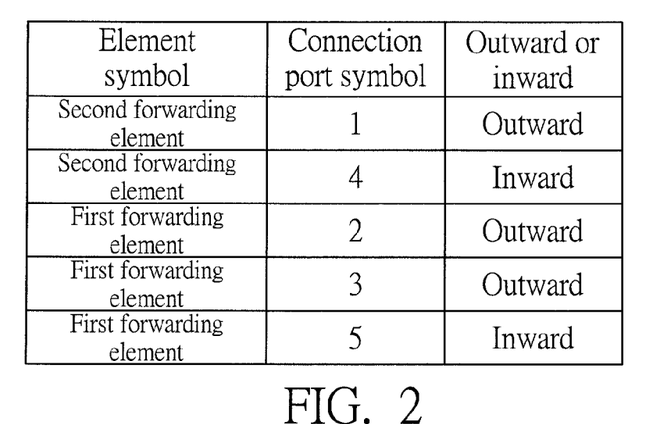
FIG. 2 shows information of a first forwarding element and a second forwarding element in FIG. 1.

When the routing system 100 operates, the control element 10 can obtain the information of the connection ports of the first forwarding element 20 and the second forwarding element 30 through the given standard protocol or other ways. The standard protocol for obtaining the information of the connection port may be, for example, the protocol specified by IETF (Internet Engineer Task Force): For CES (Forwarding and Control Element Separation) protocol. FIG. 2 shows information of the first forwarding element and the second forwarding element in FIG. 1. As shown in FIG. 2, after the control element 10 obtains the information of FIG. 2, it is obtained that the connection port 2 and the connection port 3 of the first forwarding element 20 are outward (i.e., connected to the external network), the connection port 5 of the first forwarding element 20 is inward (i.e., connected to an internal network), the connection port 1 of the second forwarding element 30 is outward (i.e., connected to the external network) and the connection port 4 of the second forwarding element 30 is inward (i.e., connected to the internal network).

In addition, the first forwarding element 20 and the second forwarding element 30 can package the standard routing information collected by the external connection port to the control element 10 via the connection port 5 and the connection port 4 respectively. The standard routing information may be obtained by, for example, the routing information protocol (RIP) calculating the distance vectors, the open shortest path first (OSPF) protocol or any other standard protocol. Consequently, the control element 10 can form the routing table according to the received routing information.

FIG. 3 shows the routing table obtained according to the routing system of FIG. 1. As shown in FIG. 3, the routing table 50 includes several pieces of routing data 50(1) to 50(7) each including a routing subnet field 51, a routing interface field 52 and a routing gateway field 53. The routing subnet field 51 is designated as subnets a to g. The routing interface field 52 records the numbers of connection ports connected to the subnets designated in the routing subnet field 51. The routing gateway field 53 records a next hop from the connection port recorded in the routing interface field 52 to the subnet recorded in the routing subnet field 51. When the connection port recorded in the routing interface field 52 is directly connected to the subnet designated in the routing subnet field 51, it represents that no next hop exists, and the routing gateway field 53 is recorded as "*". In addition, the routing gateway field 53 may be recorded as the number of another routing apparatus or the number of the connection port of another routing apparatus.

Taking the routing data 50(1) as an example, the routing subnet field 51 is designated as "subnet a", the routing interface field 52 is recorded as "connection port 1", and the routing gateway field 53 is recorded as "*". It represents that the routing system 100 is directly connected to the subnet a via the connection port 1. Similarly, the routing data 50(2) represents that the routing system 100 is directly connected to the subnet b via the connection port 2; and the routing data 50(3) represents that the routing system 100 is directly connected to the subnet c via the connection port 3.

Taking the routing data 50(4) as an example, the routing subnet field 51 is designated as "subnet d", the routing interface field 52 is recorded as "connection port 2", and the routing gateway field 53 is recorded as "routing apparatus A". It represents that the connection port 2 of the routing system 100 is connected to the subnet d through the routing apparatus A. Similarly, the routing data 50(5) represents that the connection port 2 of the routing system 100 is connected to the subnet e through the routing apparatus A; the routing data 50(6) represents that the connection port 2 of the routing system 100 is connected to the subnet f through the routing apparatus A; and the routing data 50(7) represents that the connection port 2 of the routing system 100 is connected to the subnet g through the routing apparatus A.

Figure 4B:
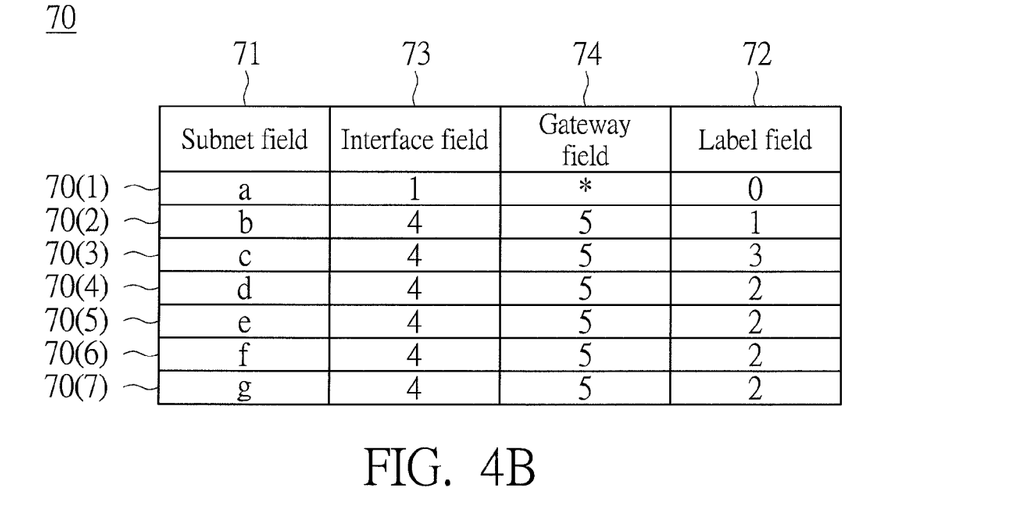
FIG. 4B shows a forwarding table of the second forwarding element of FIG. 1.

FIG. 4A shows the forwarding table of the first forwarding element of FIG. 1. FIG. 4B shows the forwarding table of the second forwarding element of FIG. 1. FIG. 5A shows the exchanging table of the first forwarding element of FIG. 1. FIG. 5B shows an exchanging table of the second forwarding element of FIG. 1. After acquiring the information of the first forwarding element 20 and the second forwarding element 30 illustrated in FIG. 2 and the routing table 50 illustrated in FIG. 3, the forwarding table 60 and the exchanging table 80 of the first forwarding element 20 can be obtained, and the forwarding table 70 and the exchanging table 90 of the second forwarding element 30 can be obtained.

As shown in FIG. 4A, the forwarding table 60 of the first forwarding element 20 includes several pieces of forwarding data 60(1) to 60(7). Each piece of forwarding data includes a subnet field 61, a label field 62, an interface field 63 and a gateway field 64. The subnet field 61 is designated as the subnets a to g. The label field 62 has labels corresponding to the subnets a to g designated in the subnet field 61. The label is the specific value or is not the specific value. The specific value is a constant set in advance, for example. In this embodiment, the specific value is set as "0". However, the specific value may also be set as any other constant. The interface field 63 records one of the connection ports of the first forwarding element 20, and the first forwarding element 20 outputs the packet according to the connection port recorded in the interface field 63. The gateway field 64 has a next hop from the connection port recorded in the interface field 63 to the subnet recorded in the subnet field 61.

When the first forwarding element 20 receives the packet from the external network, the subnet field 61 of the forwarding table 60 is compared with the destination address of the packet to obtain the forwarding data corresponding to the destination address of the packet. If the label recorded in the label field 62 of the obtained forwarding data is not the specific value, the first forwarding element 20 forwards the packet and the label from the connection port recorded in the interface field 63 to the next hop recorded in the gateway field 64 so that the packet and the label are forwarded to the second forwarding element 30. If the label recorded in the label field 62 of the obtained forwarding data is the specific value, the first forwarding element 20 forwards the packet from the connection port recorded in the interface field 63 to the next hop recorded in the gateway field 64 so that the packet is forwarded to the destination address directly.

Taking the forwarding data 60(1) as an example, the subnet field 61 is recorded as "subnet a", the label field 62 is recorded as "1", the interface field 63 is recorded as "connection port 5" and the gateway field 64 is recorded as "connection port 4", wherein label "1" is not the specific value. Thus, it represents that when the first forwarding element 20 receives the packet with the destination address being the subnet a, the first forwarding element 20 forwards the packet and the label "1" to the connection port 4 through the connection port 5 so that the packet and the label "1" are forwarded to the second forwarding element 30.

In addition, taking the forwarding data 60(2) as an example, the subnet field 61 is recorded as "subnet b", the label field 62 is recorded as "0", the interface field 63 is recorded as "connection port 2" and the gateway field 64 is recorded as "*", wherein the label "0" is the specific value. Thus, it represents that when the first forwarding element 20 receives the packet with the destination address being the subnet b, the first forwarding element 20 forwards the packet directly to the subnet b through the connection port 2. Similarly, the first forwarding element 20 can forward the packet according to the forwarding data 60(3) to 60(7).

As shown in FIG. 4B, the forwarding table 70 of the second forwarding element 30 has the same data structure as the forwarding table 60 of the first forwarding element 20. The forwarding table 70 of the second forwarding element 30 includes several pieces of forwarding data 70(1) to 70(7). Each piece of forwarding data includes a subnet field 71, a label field 72, an interface field 73 and a gateway field 74. The subnet field 71 is designated as the subnets a to g. The label field 72 has the labels corresponding to the subnets a to g designated in the subnet field 71. The label is the specific value or is not the specific value. The interface field 73 records one of the connection ports of the second forwarding element 30, and the second forwarding element 30 outputs the packet according to the connection port recorded in the interface field 73. The gateway field 74 has a next hop from the connection port recorded in the interface field 73 to the subnet recorded in the subnet field 71.

When the second forwarding element 30 receives the packet from the external network, the subnet field 71 of the forwarding table 70 is compared with the destination address of the packet to obtain the forwarding data corresponding to the destination address of the packet. If the label recorded in the label field 72 of the obtained forwarding data is not the specific value, the second forwarding element 30 forwards the packet and the label from the connection port recorded in the interface field 73 to the next hop recorded in the gateway field 74 so that the packet and the label are forwarded to the first forwarding element 20. If the label recorded in the label field 72 of the obtained forwarding data is the specific value, the second forwarding element 30 forwards the packet from the connection port recorded in the interface field 73 to the next hop recorded in the gateway field 74 so that the packet is forwarded to the destination address directly.

Taking the forwarding data 70(1) as an example, the subnet field 71 is recorded as "subnet a", the label field 72 is recorded as "0", the interface field 73 is recorded as "connection port 1" and the gateway field 74 is recorded as "*", wherein the label "0" is the specific value. Thus, it represents that when the second forwarding element 30 receives the packet with the destination address being the subnet a, the second forwarding element 30 directly forwards the packet to the subnet a through the connection port 1.

In addition, taking the forwarding data 70(2) as an example, the subnet field 71 is recorded as "subnet b", the label field 72 is recorded as "1", the interface field 73 is recorded as "connection port 4" and the gateway field 74 is recorded as "connection port 5", wherein the label "1" is not the specific value. Thus, it represents that when the second forwarding element 30 receives the packet with the destination address being the subnet b, the second forwarding element 30 forwards the packet to the connection port 5 through the connection port 4 so that the packet is forwarded to the subnet b. Similarly, the second forwarding element 30 may forward the packet according to the forwarding data 70(3) to 70(7).

As shown in FIG. 5A, the exchanging table 80 of the first forwarding element 20 includes several pieces of exchanging data 80(1) to 80(3). Each piece of exchanging data includes a label field 81, an interface field 82 and a gateway field 83. The label field 81 corresponds to the label recorded in the label field 72 in the forwarding table 70 of the second forwarding element 30. The interface field 82 records one of the connection ports of the first forwarding element 20, and the first forwarding element 20 outputs the packet according to the connection port recorded in the interface field 82. The gateway field 83 is the next hop from the connection port of the interface field 82. Furthermore, the labels recorded in the label field 81 are preferably the continuous positive integers "1", "2", . . . , and the positions of the exchanging data 80(1) to 80(3) in the exchanging table 80 are sequentially stored according to the size of the label recorded in the label field 81.

When the first forwarding element 20 receives the packet and the label, the corresponding exchanging data is obtained from the exchanging table 80 according to the label, and the packet is forwarded to the next hop recorded in the gateway field 83 through the connection port recorded in the interface field 82 so that the packet is forwarded to the destination address.

Taking the exchanging data 80(1) as an example, the label field 81 is recorded as "1", the interface field 82 is recorded as "connection port 2" and the gateway field 83 is recorded as "*". So, it represents that when the first forwarding element 20 receives the packet and the label "1", the first forwarding element 20 forwards the packet to the destination address through the connection port 2 according to the first piece of exchanging data 80(1) of the exchanging table 80. Taking the exchanging data 80(2) as an example, the label field 81 is recorded as "2", the interface field 82 is recorded as "connection port 2" and the gateway field 83 is recorded as "routing apparatus A". So, it represents that when the first forwarding element 20 receives the packet and the label "2", the first forwarding element 20 forwards the packet to the routing apparatus A through the connection port 2 according to the second piece of exchanging data 80(2) of the exchanging table 80 so that the packet is forwarded to the destination address. In addition, the exchanging data 80(3) represents that when the first forwarding element 20 receives the packet and the label "3", the first forwarding element 20 forwards the packet to the destination address through the connection port 3 according to the third piece of exchanging data 80(3) of the exchanging table 80.

As shown in FIG. 5B, the exchanging table 90 of the second forwarding element 30 has the same data structure as the exchanging table 80 of the first forwarding element 20. The exchanging table 90 of the second forwarding element 30 includes exchanging data 90(1). The exchanging data includes a label field 91, an interface field 92 and a gateway field 93. The label field 91 corresponds to the label recorded in the label field 62 in the forwarding table 60 of the first forwarding element 20. The interface field 92 records one of the connection ports of the second forwarding element 30, and the second forwarding element 30 outputs the packet according to the connection port recorded in the interface field 92. The gateway field 93 is the next hop from the connection port recorded in the interface field 92. Furthermore, the labels recorded in the label field 91 are preferably the continuous positive integers "1", "2", . . . , and the positions of each piece of exchanging data in the exchanging table 90 are sequentially stored according to the size of the label recorded in the label field 91.

When the second forwarding element 30 receives the packet and the label, the corresponding exchanging data is obtained from the exchanging table 90 according to the label, and the packet is forwarded to the next hop recorded in the gateway field 93 through the connection port recorded in the interface field 92 so that the packet is forwarded to the destination address.

Taking the exchanging data 90(1) as an example, the label field 91 is recorded as "1", the interface field 92 is recorded as "connection port 1" and the gateway field 93 is recorded as "*". So, it represents that when the second forwarding element 30 receives the packet and the label "1", the second forwarding element 30 forwards the packet to the destination address through the connection port 1 according to the first piece of exchanging data 90(1) of the exchanging table 90.

Figure 6:
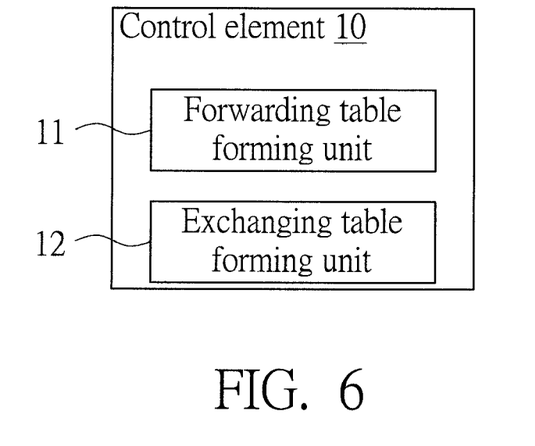
FIG. 6 is a functional block diagram showing a control element of FIG. 1.

FIG. 6 is a functional block diagram showing the control element of FIG. 1. Referring to FIG. 6, the control element 10 includes a forwarding table forming unit 11 and an exchanging table forming unit 12. The forwarding table forming unit 11 forms the forwarding table 60 of the first forwarding element 20 and the forwarding table 70 of the second forwarding element 30 according to the routing table 50. The exchanging table forming unit 12 forms the exchanging table 80 of the first forwarding element 20 and the exchanging table 90 of the second forwarding element 30 according to the routing table 50.

Figure 7:
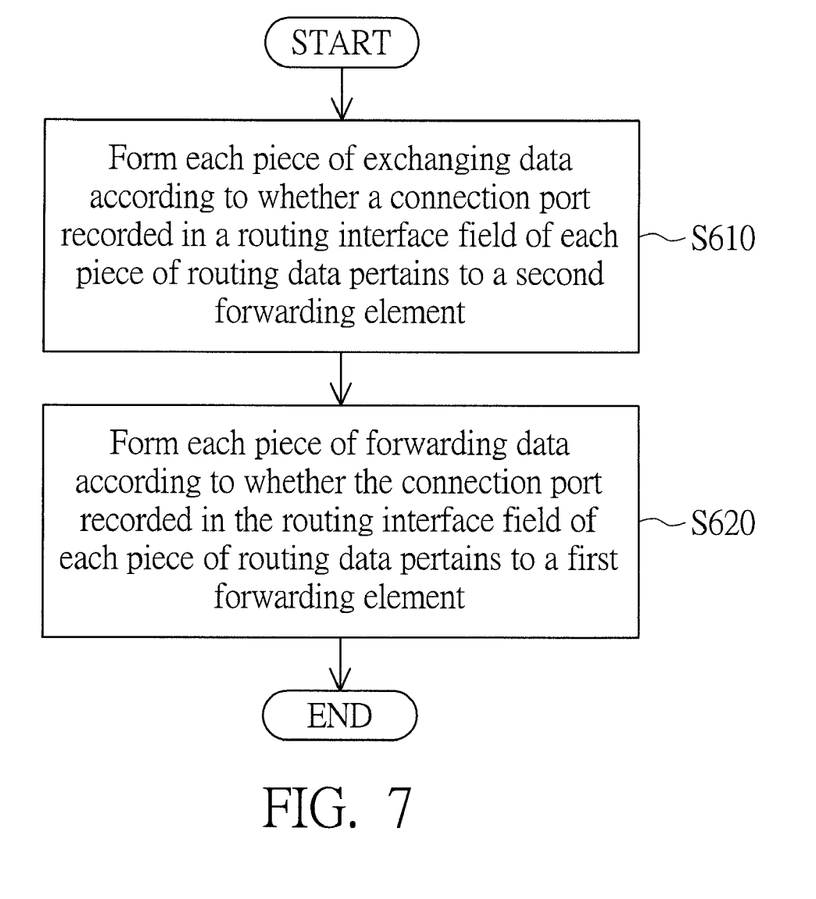
FIG. 7 is a flow chart showing a forming method for the exchanging table and the forwarding table of the control element.

FIG. 7 is a flow chart showing a forming method for the exchanging table and the forwarding table of the control element. In this example herein, the forwarding table 60 of the first forwarding element 20 and the exchanging table 90 of the second forwarding element 30 are formed. First, as shown in step S610, the control element 10 judges whether the connection port recorded in the routing interface field 52 of each piece of routing data pertains to the second forwarding element 30 so as to form each piece of exchanging data. Next, as shown in step S620, the control element 10 judges whether the connection port recorded in the routing interface field 52 of each piece of routing data pertains to the first forwarding element 20 so as to form each piece of forwarding data.

Figure 8:
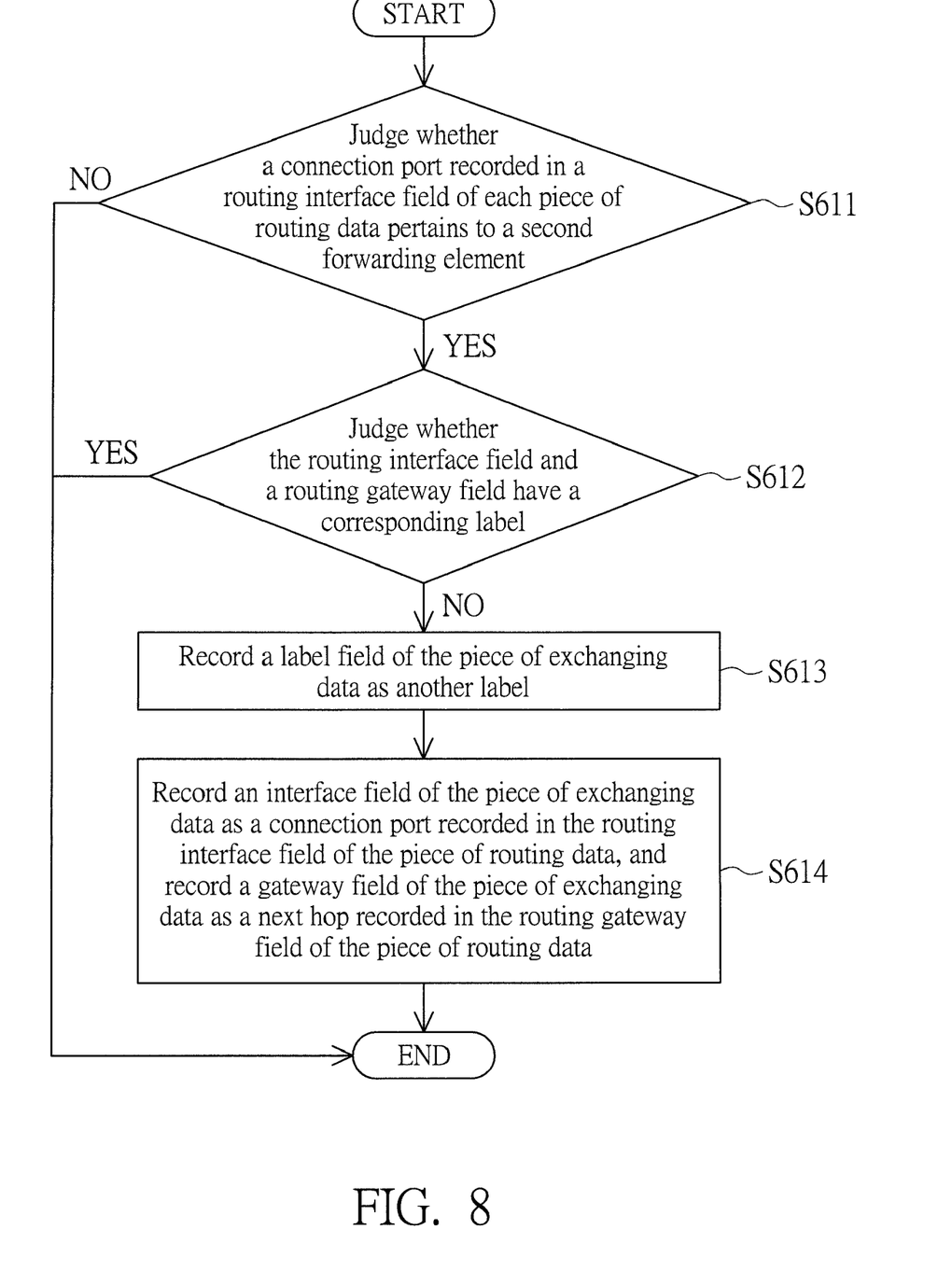
FIG. 8 is a detailed flow chart showing steps of forming each piece of exchanging data in FIG. 7.

FIG. 8 is a detailed flow chart showing steps of forming each piece of exchanging data in FIG. 7. First, as shown in step S611, it is judged whether the connection port recorded in the routing interface field 52 of each piece of routing data pertains to the second forwarding element 30. If the connection port recorded in the routing interface field 52 of each piece of routing data does not pertain to the second forwarding element 30, it represents that the piece of routing data does not have the corresponding exchanging data, and the forming method for the piece of exchanging data ends. If the connection port recorded in the routing interface field 52 of each piece of routing data pertains to the second forwarding element 30, it represents that the piece of routing data has the corresponding exchanging data, and step S612 is performed.

Next, as shown in the step S612, it is judged that whether the routing interface field 52 and the routing gateway field 53 of the piece of routing data have the corresponding label or not. If yes, the forming method for the piece of exchanging data ends; otherwise step S613 is performed.

Then, as shown in the step S613, the label field 91 of the piece of exchanging data is set as a new label, which is preferably sequentially set as the continuous positive integer.

Next, as shown in step S614, the interface field 92 of the piece of exchanging data is recorded as the connection port recorded in the routing interface field 52 of the piece of routing data, and the gateway field 93 of the piece of exchanging data is set as the next hop recorded in the routing gateway field 53 of the piece of routing data.

The exchanging table 90 of the second forwarding element 30 can be obtained according to the steps S611 to S614. In this embodiment, the example of forming the exchanging table 90 of the second forwarding element 30 is illustrated. However, it is also possible to form the exchanging table 80 of the first forwarding element 20 according to a similar method, so detailed descriptions thereof will be omitted.

Figure 9:
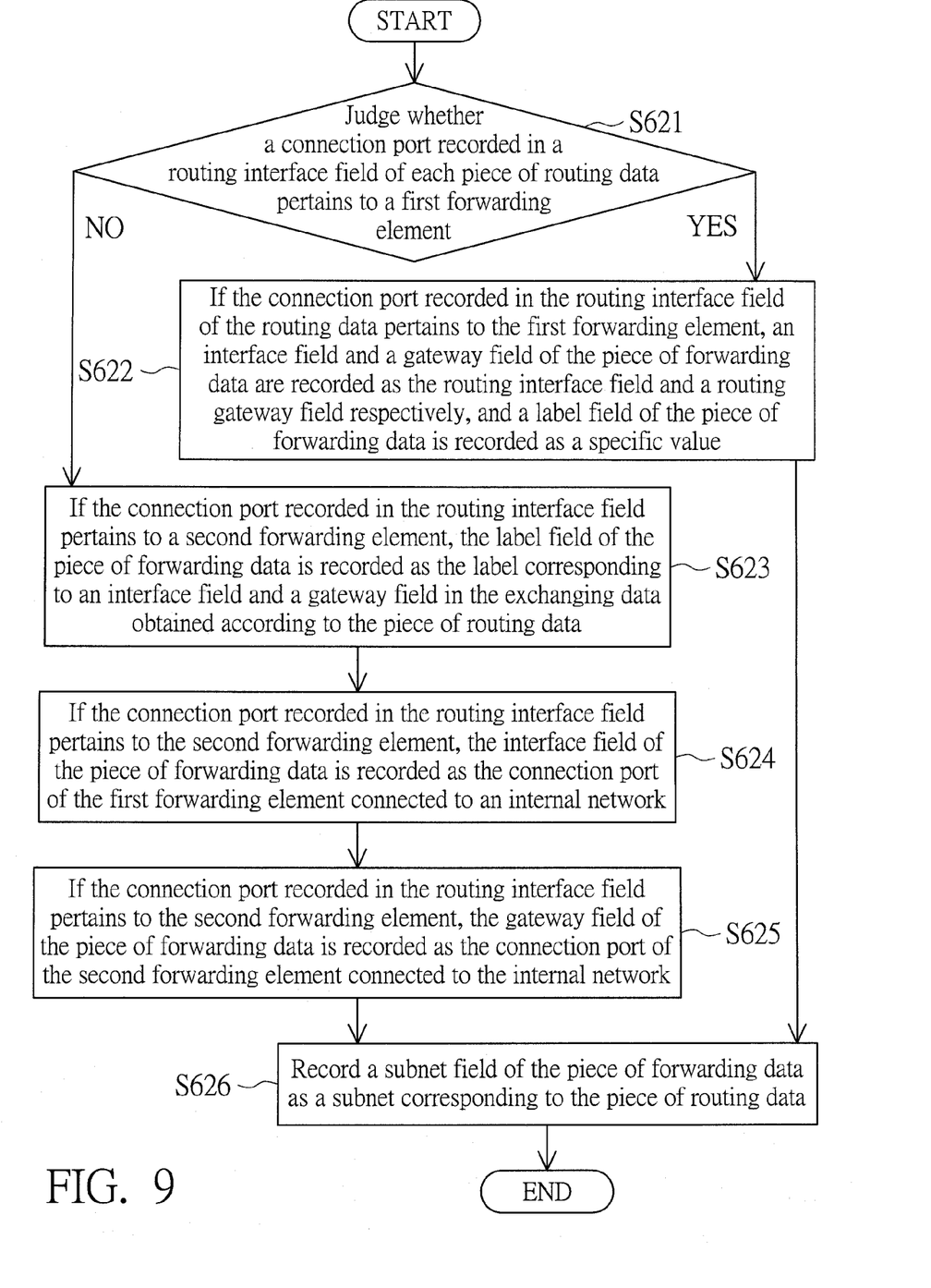
FIG. 9 is a detailed flow chart showing steps of forming each piece of forwarding data in FIG. 7.

FIG. 9 is a detailed flow chart showing steps of forming each piece of forwarding data in FIG. 7. First, as shown in step S621, it is judged whether the connection port recorded in the routing interface field 52 of each piece of routing data pertains to the first forwarding element 20.

Next, as shown in step S622, if the connection port recorded in the routing interface field 52 of the piece of routing data pertains to the first forwarding element 20, the interface field 63 of the piece of forwarding data is set as the connection port recorded in the routing interface field 52 of the piece of routing data, the gateway field 64 is set as the next hop recorded in the routing gateway field 53 of the piece of routing data, and the label of the label field 62 is set as the specific value.

Then, as shown in step S623, if the connection port recorded in the routing interface field 52 of the piece of routing data pertains to the second forwarding element 30, the label field 62 of the piece of forwarding data of the forwarding table 60 is set as the label corresponding to the interface field 92 and the gateway field 93 in the exchanging data obtained according to the piece of routing data.

Next, as shown in step S624, if the connection port recorded in the routing interface field 52 of the piece of routing data pertains to the second forwarding element 30, the interface field 63 of the piece of forwarding data is recorded as the connection port (i.e., the connection port 5) connected to the internal network 40 in the first forwarding element 20.

Then, as shown in step S625, if the connection port recorded in the routing interface field 52 of the piece of routing data pertains to the second forwarding element 30, the gateway field 64 of the piece of forwarding data is recorded as the connection port (i.e., the connection port 4) connected to the internal network 40 in the second forwarding element 30.

Next, as shown in step S626, the subnet field 61 of the piece of forwarding data is recorded as the subnet corresponding to the piece of routing data.

In this embodiment, the routing system 100 illustrated has two forwarding elements (the first forwarding element 20 and the second forwarding element 30). Thus, in the steps S621 to S626, the forwarding table 60 is formed by judging whether the connection port recorded in the routing interface field 52 pertains to the first forwarding element 20 or the second forwarding element 30. In practice, however, if the routing system further includes a third forwarding element, the method of forming each piece of forwarding data further includes the step of judging whether the connection port recorded in the routing interface field 52 pertains to the third forwarding element so as to form the corresponding forwarding data. The forwarding table 60 of the first forwarding element 20 can be obtained according to the mentioned steps S621 to S626. In this embodiment, although the example of forming the forwarding table 60 of the first forwarding element 20 is illustrated, the forwarding table 70 of the second forwarding element 30 may also be formed according to the similar method form, so detailed descriptions thereof will be omitted.

In order to forward the label between the first forwarding element 20 and the second forwarding element 30, the label may be carried within the routing system 100 according to the virtual local area network tag (VLAN tag), the multi-protocol label switching (MPLS) or any other method, which is applied to the internal network 40 without influencing the forwarding function.

Figure 10:
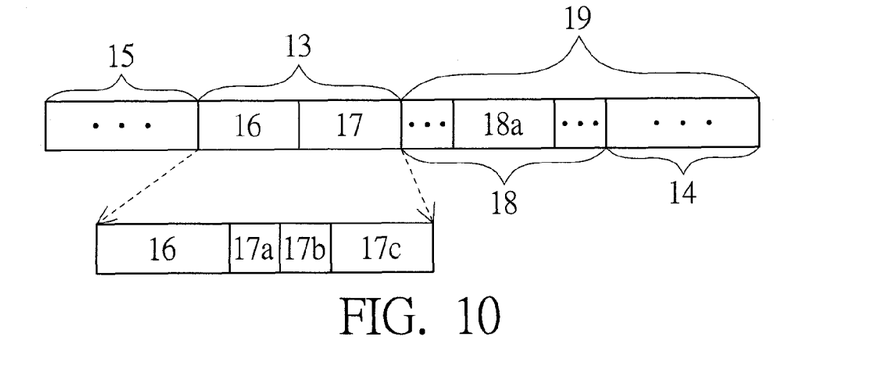
FIG. 10 is a schematic illustration showing a packet having a VLAN tag.

In this embodiment, the method of carrying the label in the packet is to record the label to the VLAN tag of the packet. FIG. 10 is a schematic illustration showing a packet having a VLAN tag. When the packet carries the label, it is a packet satisfying the 802.1Q protocol and includes an Ethernet header 15, a VLAN tag 13 and an Ethernet payload 19. Compared with the typical Ethernet packet, the packet further includes the VLAN tag 13, which includes a VLAN protocol identifier (VLAN protocol ID) 16 and tag control information 17.

When the VLAN protocol ID 16 is recorded as the value of 0x8100, it represents that the packet satisfies the 802.1Q protocol. The tag control information 17 records the information of the virtual local area network and includes a priority field 17a, a canonical format indicator (CFI) 17b and a VLAN indicator 17c. The priority field 17a designates the priority order of the packet. The CFI 17b is designated as "0" to represent that the packet does not include the routing information field (RIF). In the specification of the VLAN, the VLAN indicator 17c designates which VLAN the packet pertains to. In this embodiment, the VLAN indicator 17c records the label of the packet so that the packet carries the label. The Ethernet payload 19 includes an IP header 18 and data 14. The content of the packet is recorded in the data 14.

The VLAN tag 13 only exists in the packet when the packet is forwarded in the routing system 100. That is, when the first forwarding element 20 or the second forwarding element 30 receives the packet from the external network, the packet only has the Ethernet header 15 and the Ethernet payload 19. When the packet is forwarded from the first forwarding element 20 to the second forwarding element 30, or from the second forwarding element 30 to the first forwarding element 20, the VLAN protocol ID 16 and the tag control information 17 are added to the packet so that the label is carried. When the packet is directly forwarded from the first forwarding element 20 or the second forwarding element 30 to the external network, the packet only has the Ethernet header 15 and the Ethernet payload 19. Consequently, the method of carrying the label by the packet does not influence the forwarding way and format of the packet between the external networks.

In addition, the IP header 18 of the packet includes a time-to-live (TTL) parameter 18a for recording a limit period time of the packet. When the TTL parameter 18a is descended till 0, it represents that the forwarding path of the packet is too long, and the packet should be discarded.

Figure 11:
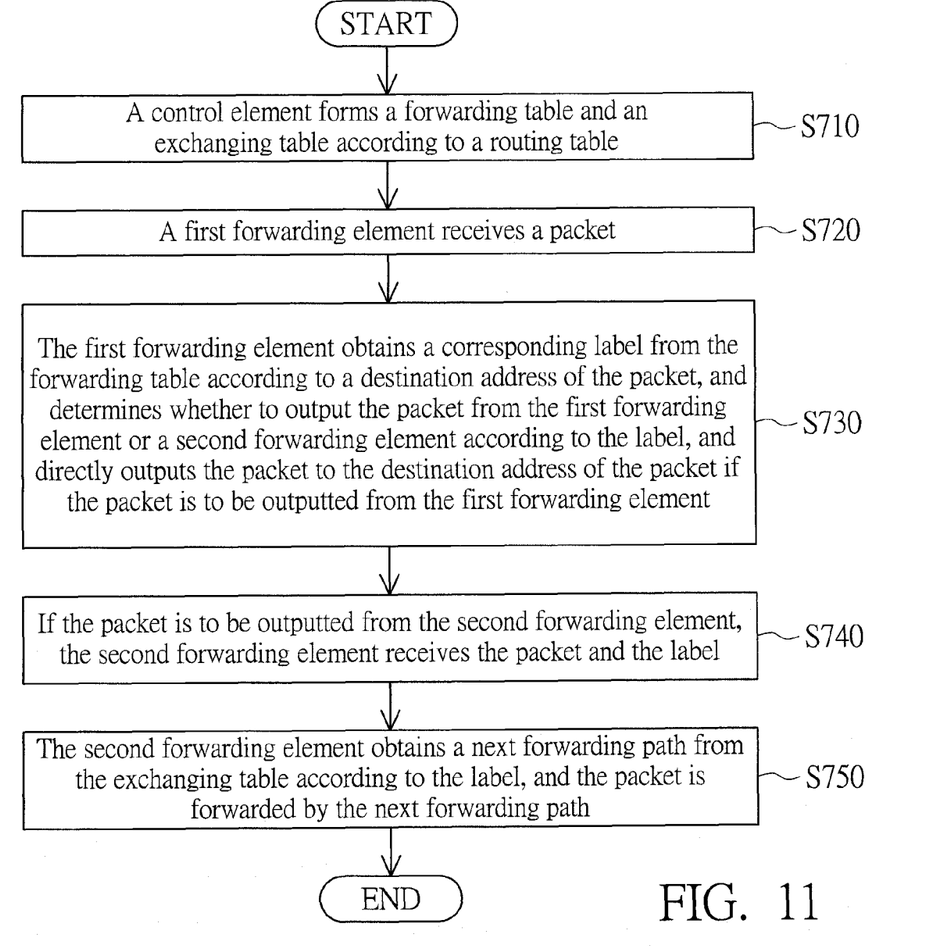
FIG. 11 is a flow chart showing a routing method.

FIG. 11 is a flow chart showing a routing method. Referring to FIG. 11 in conjunction with the element symbols in FIGS. 1, 4A and 5B, the method includes the following steps. First, as shown in step S710, the forwarding table forming unit 11 of the control element 10 forms the forwarding table 60 of the first forwarding element 20 according to the routing table 50, and the exchanging table forming unit 12 of the control element 10 forms the exchanging table 90 of the second forwarding element 30 according to the routing table 50.

Next, as shown in step S720, the first forwarding element 20 receives the packet from the external network.

Then, as shown in step S730, the first forwarding element 20 obtains the corresponding label from the forwarding table 60 according to the destination address of the packet, and determines to output the packet from the first forwarding element 20 or the second forwarding element 30 according to the label. If the packet is to be outputted from the first forwarding element 20, the packet is directly outputted to the destination address of the packet.

Next, as shown in step S740, if the packet is to be outputted from the second forwarding element 30, the second forwarding element 30 receives the packet and the label from the internal network 40. The label is recorded to the VLAN tag of the packet so that the packet can carry the label. However, the packet may also carry the label according to the MPLS format.

Then, as shown in step S750, the second forwarding element 30 obtains the next forwarding path from the exchanging table 90 according to the label so that the packet can be forwarded by the next forwarding path.

Figure 12:
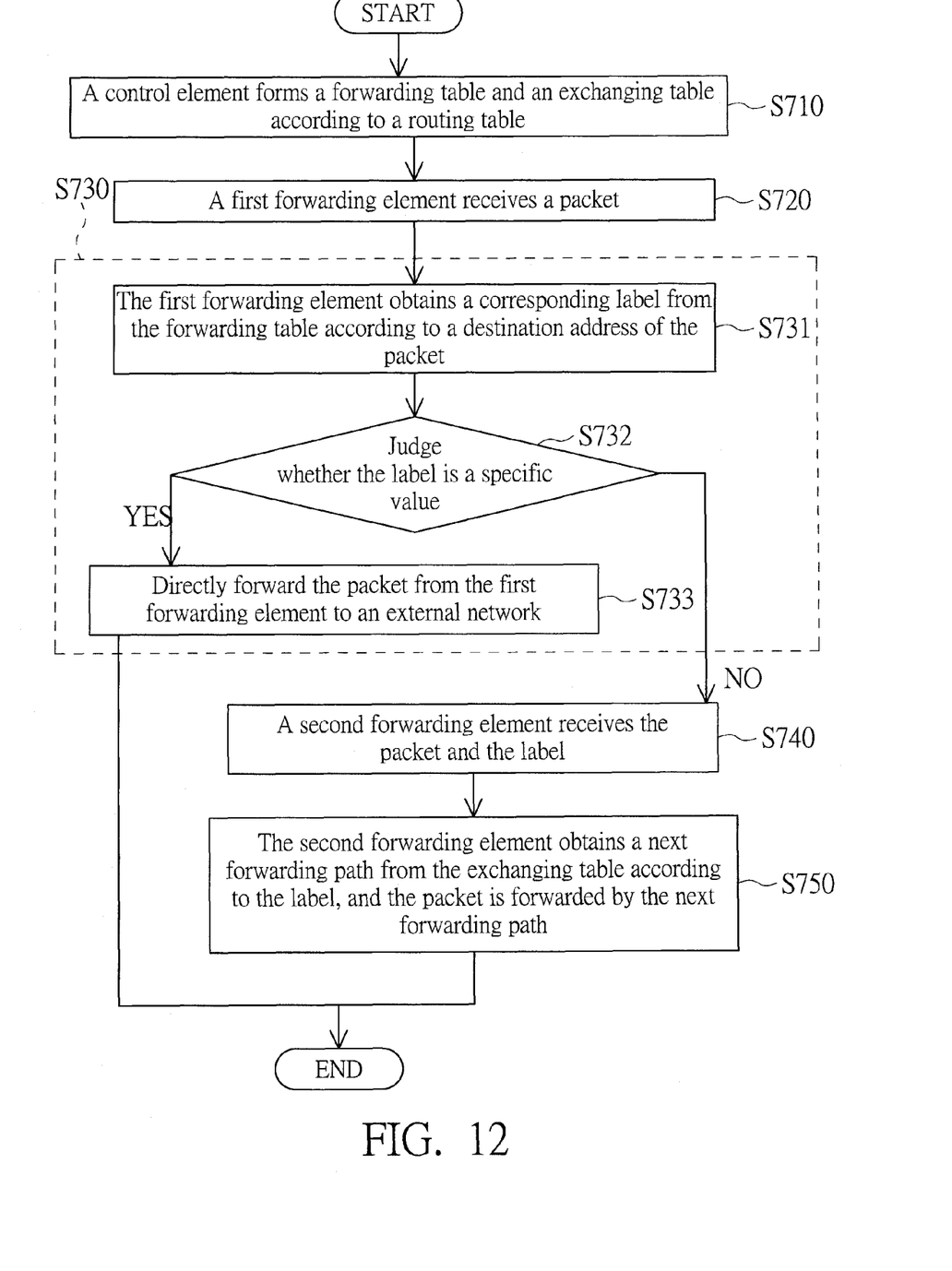
FIG. 12 is a detailed flow chart showing the routing method of FIG. 11.

FIG. 12 is a detailed flow chart showing the routing method of FIG. 11. Please refer to FIG. 12 in conjunction with the element symbols in FIGS. 1, 4A and 5B. The steps S710, S720, S740 and S750 in FIG. 12 are the same as the steps S710, S720, S740 and S750 in FIG. 11, so detailed descriptions thereof will be omitted.

The step S730 includes steps S731 to S733. First, as shown in the step S731, the first forwarding element 20 obtains the corresponding label from the forwarding table 60 according to the destination address of the packet. Next, as shown in the step S732, it is judged that whether the label is the specific value or not. If the label is not the specific value, the step S740 is performed. If the label is the specific value, the step S733 is performed. Next, as shown in the step S733, the packet is directly forwarded to the external network from the first forwarding element 20.

For example, when the first forwarding element 20 receives the packet P1 with the destination address being the subnet a from the external network through the connection port 3, the first forwarding element 20 obtains the forwarding data 60(1) of the subnet field 61 designated as the subnet a from the forwarding table 60 so as to acquire the label "1" recorded in the label field 62 of the forwarding data 60(1). The first forwarding element 20 judges that the label "1" is not the specific value, and the first forwarding element 20 forwards the packet P1 and the label "1" to the connection port 4 through the connection port 5 according to the "connection port 5" recorded in the interface field 63 of the forwarding data 60(1) and the "connection port 4" recorded in the gateway field 64 of the forwarding data 60(1). Thus, the packet P1 and the label "1" can be forwarded to the second forwarding element 30.

Next, after the second forwarding element 30 receives the packet P1 and the label "1", the second forwarding element 30 obtains the exchanging data 90(1) which the label field 91 recorded as "1" from the exchanging table 90 according to the label "1", and forwards the packet P1 to the destination address through the connection port 1 according to the "connection port 1" recorded in the interface field 92 and the "*" recorded in the gateway field 93.

In addition, when the first forwarding element 20 receives the packet P2 with the destination address being the subnet e from the external network through the connection port 31 the first forwarding element 20 obtains the forwarding data 60(5) which the subnet field 61 designated as the subnet e from the forwarding table 60 so as to obtain the label "0" recorded in the label field 62 of the forwarding data 60(5). The first forwarding element 20 judges the label "0" as the specific value, and the first forwarding element 20 forwards the packet P2 to the routing apparatus A through the connection port 2 according to the "connection port 2" recorded in the interface field 63 of the forwarding data 60(5) and the "routing apparatus A" recorded in the gateway field 64. Thus, the packet P2 can be forwarded to the subnet e.

In addition, the routing method descends the TTL parameter 18*a* when the first forwarding element 20 or the second forwarding element 30 receives the packet from the external network, as shown in FIG. 10. When the TTL parameter 18*a* is descended to 0, it represents that the forward path of the packet is too long and the packet should be discarded. Furthermore, when the first forwarding element 20 or the second forwarding element 30 receives the packet from the external network, it will check the Ethernet header 15 of the packet to ensure the correctness of the packet. In addition, after the first forwarding element 20 or the second forwarding element 30 receives the packet and the label from the internal network 40, the VLAN protocol ID 16 and the tag control information 17 are preferably removed. Next, the Ethernet header 15 of the packet is checked to ensure the completeness of the packet.

The routing system, the control element, the routing method and the forming method for the exchanging table and the forwarding table according to the preferred embodiments of the invention have the following features. First, the first forwarding element receives the packet from the external network and obtains the label from the forwarding table of the first forwarding element according to the destination address of the packet. If the first forwarding element judges that the label is not the specific value, the packet and the label are forwarded to the second forwarding element. If the first forwarding element judges the label as the specific value, the packet is directly outputted to the external network from the connection port of the first forwarding element. After receiving the packet and the label, the second forwarding element obtains the next forwarding path from the exchanging table according to the label so as to forward the packet. Consequently, the second forwarding element obtains the next forwarding path of the packet by way of label mapping, and thus can shorten the time of packet comparing and enhance the routing efficiency. In addition, the packet carries the label only when being forwarded in the routing system. Thus, the transmission way and format of the packet between the external networks are not influenced. In addition, the label can be carried within the routing system by different methods and protocols, and thus can be adapted to any routing system.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A routing system, comprising:
a control element for forming a forwarding table and an exchanging table according to a routing table;
a first forwarding element, coupled to the control element, for receiving a packet, obtaining a corresponding label from the forwarding table according to a destination address of the packet, and determining whether to output the packet directly from the first forwarding element to the destination address of the packet according to the label; and
a second forwarding element, coupled to the control element, for receiving the packet and the label outputted from the first forwarding element and obtaining a next forwarding path from the exchanging table according to the label to forward the packet if the packet is to be outputted from the second forwarding element;
wherein the routing system is connected to an external network having a plurality of subnets, the routing system is connected to the subnets through a plurality of connection ports, and the forwarding table comprises:
a first subnet field for designating one of the subnets;
a first label field having a symbol corresponding to the subnet designated by the first subnet field;
a first interface field for recording one of the connection ports pertaining to the first forwarding element; and
a first gateway field for recording a next hop from the connection port recorded in the first interface field to the subnet recorded in the first subnet field,
wherein the first forwarding element obtains the label according to the first label field corresponding to the first subnet field recorded as the destination address of the packet, and forwards the packet and the label from the connection port recorded in the first interface field to the next hop recorded in the first gateway field; and
wherein the exchanging table comprises:
a second label field corresponding to the first label field to make the symbol of the second label field correspond to the subnet designated by the first subnet field;
a second interface field for recording one of the connection ports pertaining to the second forwarding element; and
a second gateway field for recording the next hop from the connection port recorded in the second interface field to the subnet corresponding to the symbol of the second label field,
wherein the second forwarding element forwards the packet from the connection port correspondingly recorded in the second interface field to the next hop recorded in the second gateway field according to the second label field recorded as the label and the labels recorded in the second label field are stored sequentially according to the size of the label.

2. The routing system according to claim 1, wherein the first forwarding element judges whether the label is a specific value, and the label and the packet are outputted from the first forwarding element to the second forwarding element when the label is not the specific value.

3. The routing system according to claim 1, wherein the first forwarding element judges whether the label is a specific value, and the packet is directly outputted from the first forwarding element to the destination address of the packet when the label is the specific value.

4. The routing system according to claim 1, wherein the first forwarding element checks a header of the packet and descends a time-to-live (TTL) parameter of the packet after receiving the packet from an external network.

5. The routing system according to claim 1, wherein the second forwarding element removes the label from the packet and checks a header of the packet after receiving the packet and the label from an internal network.

6. The routing system according to claim 1, wherein when the packet is outputted from the first forwarding element to the second forwarding element, the label of the packet is record to a virtual local area network tag (VLAN tag).

7. The routing system according to claim 1, wherein the packet is outputted from the first forwarding element to the second forwarding element, the label is carried in the packet with multi-protocol label switching (MPLS) format.

8. A control element applied to a routing system, the control element comprises:
 a forwarding table forming unit for forming a forwarding table of a first forwarding element according to a routing table, wherein the first forwarding element, coupled to the control element, receives a packet and obtains a corresponding label from the forwarding table according to a destination address of the packet; and
 an exchanging table forming unit for forming an exchanging table of a second forwarding element according to the routing table, wherein the second forwarding element, coupled to the control element, receives the packet and the label outputted from the first forwarding element, and obtains a next forwarding path from the exchanging table according to the label to forward the packet;
 wherein the routing system is connected to an external network having a plurality of subnets, the routing system is connected to the subnets through a plurality of connection ports, and the forwarding table comprises:
  a first subnet field for designating one of the subnets;
  a first label field having a symbol corresponding to the subnet designated by the first subnet field;
  a first interface field for recording one of the connection ports pertaining to the first forwarding element; and
  a first gateway field for recording a next hop from the connection port recorded in the first interface field to the subnet recorded in the first subnet field;
  wherein the first forwarding element obtains the label according to the first label field corresponding to the first subnet field recorded as the destination address of the packet, and forwards the packet and the label from the connection port recorded in the first interface field to the next hop recorded in the first gateway field;
 wherein the exchanging table comprises:
  a second label field corresponding to the first label field to make the symbol of the second label field correspond to the subnet designated by the first subnet field;
  a second interface field for recording one of the connection ports pertaining to the second forwarding element; and
  a second gateway field for recording the next hop from the connection port recorded in the second interface field to the subnet corresponding to the symbol of the second label field,
  wherein the second forwarding element forwards the packet from the connection port correspondingly recorded in the second interface field to the next hop recorded in the second gateway field according to the second label field recorded as the label;
 wherein the labels recorded in the second label field are stored sequentially according to the size of the label.

9. The control element according to claim 8, wherein the first forwarding element judges whether the label is a specific value, and the label and the packet are outputted from the first forwarding element to the second forwarding element when the label is not the specific value.

10. The control element according to claim 8, wherein the first forwarding element judges whether the label is a specific value, and the packet is directly outputted from a connection port of the first forwarding element to the destination address of the packet when the label is the specific value.

11. The control element according to claim 8, wherein the first forwarding element checks a header of the packet and descends a time-to-live (TTL) parameter of the packet after receiving the packet from an external network.

12. The control element according to claim 8, wherein the second forwarding element removes the label from the packet and checks a header of the packet after receiving the packet and the label from an internal network.

13. The control element according to claim 8, wherein when the packet is outputted from the first forwarding element to the second forwarding element, the label of the packet is record to a virtual local area network tag (VLAN tag).

14. The control element according to claim 8, wherein when the packet is outputted from the first forwarding element to the second forwarding element, the label is carried in the packet with multi-protocol label switching (MPLS) format.

15. A routing method, comprising:
 (a) forming, by a control element, a forwarding table and an exchanging table according to a routing table;
 (b) receiving a packet by a first forwarding element, wherein the first forwarding element is coupled to the control element;
 (c) obtaining, by the first forwarding element, a corresponding label from the forwarding table according to a destination address of the packet, and determining whether to output the packet from the first forwarding element or a second forwarding element according to the label, wherein the second forwarding element is coupled to the control element and the packet is outputted to the destination address of the packet directly if the packet is to be outputted from the first forwarding element;
 (d) receiving the packet and the label by the second forwarding element if the packet is to be outputted from the second forwarding element; and
 (e) obtaining, by the second forwarding element, a next forwarding path from the exchanging table according to the label to forward the packet,
 wherein the control element, the first forwarding element and the second forwarding element constitute a routing system;
 wherein the routing table has a plurality of pieces of routing data, each of the pieces of routing data has a routing interface field and a routing gateway field, the exchanging table has a plurality of pieces of exchanging data, the forwarding table has a plurality of pieces of forwarding data, and the step (a) comprises:
  (a1)) forming each of the pieces of exchanging data according to whether a connection port recorded in the routing interface field of each of the pieces of routing data pertains to the second forwarding element; and
  (a2) forming each of the pieces of forwarding data according to whether the connection port recorded in the routing interface field of each of the pieces of routing data pertains to the first forwarding element;
 wherein the step (a1)) comprises:
  (a11) judging whether the connection port recorded in the routing interface field of each of the pieces of routing data pertains to the second forwarding element;
  (a12) judging whether the routing interface field and the routing gateway field have the corresponding label if the connection port recorded in the routing interface field pertains to the second forwarding element; and
  (a13) recording a second label field of the piece of exchanging data as another label if the routing interface field and the routing gateway field does not have the corresponding label;
 wherein the labels recorded in the second label field are stored sequentially according to the size of the label.

16. The routing method according to claim 15, wherein the step (c) comprises:
- judging whether the label is a specific value, and directly outputting the packet from a connection port of the first forwarding element to the destination address of the packet if the label is the specific value, or outputting the packet and the label to the second forwarding element if the label is not the specific value.

17. The routing method according to claim 15, wherein the step (b) comprises:
- checking a header of the packet and descending a time-to-live (TTL) parameter of the packet by the first forwarding element after receiving the packet from an external network.

18. The routing method according to claim 15, wherein the step (d) comprises:
- removing the label from the packet and checking a header of the packet by the second forwarding element after receiving the packet and the label from an internal network.

19. The routing method according to claim 15, wherein the step (a1) further comprises:
- (a14) recording a second interface field of the piece of exchanging data as the connection port recorded in the routing interface field, and recording a second gateway field of the piece of exchanging data as a next hop recorded in the routing gateway field of the piece of routing data.

20. The routing method according to claim 19, wherein the step (a2) comprises:
- (a21) judging whether the connection port recorded in the routing interface field of each of the pieces of routing data pertains to the first forwarding element;
- (a22) recording a first interface field and a first gateway field of the piece of forwarding data as the routing interface field and the routing gateway field respectively, and recording a first label field of the piece of forwarding data as a specific value if the connection port recorded in the routing interface field pertains to the first forwarding element;
- (a23) recording the first label field of the piece of forwarding data as the label corresponding to the second interface field and the second gateway field in the piece of exchanging data obtained according to the piece of routing data if the connection port recorded in the routing interface field pertains to the second forwarding element;
- (a24) recording the first interface field of the piece of forwarding data as a connection port of the first forwarding element connected to an internal network if the connection port recorded in the routing interface field pertains to the second forwarding element; and
- (a25) recording the first gateway field of the piece of forwarding data as a connection port of the second forwarding element connected to the internal network if the connection port recorded in the routing interface field pertains to the second forwarding element.

21. The routing method according to claim 20, wherein the external network comprises a plurality of subnets, and the step (a2) further comprises:
- (a26) recording a first subnet field of the piece of forwarding data as the subnet corresponding to the piece of routing data.

22. The routing method according to claim 15, wherein in the step (d), the label of the packet is record to a virtual local area network tag (VLAN tag).

23. The routing method according to claim 15, wherein in the step (d), the label is carried in the packet with multiprotocol label switching (MPLS) format.

24. A forming method for an exchanging table and a forwarding table of a control element, wherein the control element forms the forwarding table and the exchanging table according to a routing table, the routing table has a plurality of pieces of routing data, each of the pieces of routing data has a routing interface field and a routing gateway field, the exchanging table has a plurality of pieces of exchanging data, and the forwarding table has a plurality of pieces of forwarding data, the forming method comprising the steps of:
- (a) forming each of the pieces of exchanging data according to whether a connection port recorded in the routing interface field of each of the pieces of routing data pertains to a second forwarding element; and
- (b) forming each of the pieces of forwarding data according to whether the connection port recorded in the routing interface field of each of the pieces of routing data pertains to a first forwarding element;
- wherein the control element, the first forwarding element coupled to the control element and the second forwarding element coupled to the control element constitute a routing system; and
- the first forwarding element receives a packet, obtains a corresponding label from the forwarding table according to a destination address of the packet, and determines whether the packet is to be directly outputted to the destination address of the packet from the first forwarding element according to the label, wherein the second forwarding element receives the packet and the label outputted from the first forwarding element and obtains a next forwarding path from the exchanging table according to the label to forward the packet if the packet is to be outputted from the second forwarding element;
- wherein the step (a) comprises:
  - (a1) judging whether the connection port recorded in the routing interface field of each of the pieces of routing data pertains to the second forwarding element;
  - (a2) judging whether the routing interface field and the routing gateway field have the corresponding label if the connection port recorded in the routing interface field pertains to the second forwarding element; and
  - (a3) recording a second label field of the piece of exchanging data as another label if the routing interface field and the routing gateway field do not have the corresponding label;
- wherein the labels recorded in the second label field are stored sequentially according to the size of the label.

25. The method according to claim 24, wherein the step (a) further comprises:
- (a4) recording a second interface field of the piece of exchanging data as the connection port recorded in the routing interface field, and recording a second gateway field of the piece of exchanging data as a next hop recorded in the routing gateway field of the piece of routing data.

26. The method according to claim 25, wherein the step (b) comprises:
- (b1) judging whether the connection port recorded in the routing interface field of each of the pieces of routing data pertains to the first forwarding element;
- (b2) recording a first interface field and a first gateway field of the piece of forwarding data as the routing interface field and the routing gateway field respectively, and recording a first label field of the piece of forwarding data as a specific value if the connection port recorded in the routing interface field pertains to the first forwarding element;

(b3) recording the first label field of the piece of forwarding data as the label corresponding to the second interface field and the second gateway field in the piece of exchanging data obtained according to the piece of routing data if the connection port recorded in the routing interface field pertains to the second forwarding element;

(b4) recording the first interface field of the piece of forwarding data as a connection port of the first forwarding element connected to an internal network if the connection port recorded in the routing interface field pertains to the second forwarding element; and (b5) recording the first gateway field of the piece of forwarding data as a connection port of the second forwarding element connected to the internal network if the connection port recorded in the routing interface field pertains to the second forwarding element.

27. The method according to claim 26, wherein the routing system is connected to an external network comprising a plurality of subnets, and the step (b) further comprises:

(b6) recording a first subnet field of the piece of forwarding data as the subnet corresponding to the piece of routing data.

28. The method according to claim 24, wherein when the packet is outputted from the first forwarding element to the second forwarding element, the label of the packet is record to a virtual local area network tag (VLAN tag).

29. The method according to claim 24, wherein when the packet is outputted from the first forwarding element to the second forwarding element, the label is carried in the packet with multi-protocol label switching (MPLS) format.

* * * * *